2,837,527

PROCESS FOR PREPARING 1-ISONICOTINYL-2-CYANOMETHYLHYDRAZINE

Robert E. Carnahan, Groton, Conn., assignor to Chas. Pfizer & Co., Inc., Brooklyn, N. Y., a corporation of Delaware No Drawing. Application December 31, 1952
Serial No. 329,087

2 Claims. (Cl. 260—294.9)

This invention is concerned with certain biologically active organic compounds. In particular, it is concerned with biologically active derivatives of aromatic or heteroaromatic hydrazides.

It has recently been demonstrated that certain organic acid hydrazides and, in particular, isonicotinic acid hydrazide and alkyl derivatives thereof, are potent antitubercular compounds. These compounds do possess some deficiencies, particularly with respect to solubility in water. An appreciable solubility in water, of course, assists in administration of the material since, for instance, aqueous solutions may then be injected. Normally, these materials are given orally but, in some cases, it is useful to have an injectable preparation.

It has been found that a series of 1-aroyl-2-cyanomethylhydrazines may be prepared from the corresponding 2-unsubstituted compounds or from 2-alkyl compounds. These products are prepared through treatment with cyanide of 1-aroyl-2-sulfomethyl derivatives of hydrazine or 2-alkylhydrazines. The latter are prepared from the hydrazides by means of an alkali formaldehyde bisulfite or with a mixture of an alkali bisulfite and formaldehyde. The cyanomethyl derivatives and the intermediate sulfomethyl compounds are new. The sulfomethyl compounds in particular are highly water soluble and useful products.

The formulas of the new compounds of this invention may be represented as follows:

where R is an aryl group or a heteroaryl group. By aryl we mean such groups as phenyl, toluyl, xylyl, naphthyl, and various substituted aryl groups. R may also be a heteroaryl group such as pyridyl ($\alpha, \beta$, or $\gamma$), quinolyl, thiazolyl, pyrazinyl, and so forth. Especially valuable products are those where R is phenyl or $\gamma$-pyridyl. R' is an alkyl group either branched or straight chain having up to about six carbon atoms. The alkyl group may be substituted. R" is an alkali metal sulfomethyl group (i. e. $CH_2SO_3Na$) or a cyanomethyl group ($CH_2CN$).

The preparation of the compounds of this invention may be conducted by treatment of the desired hydrazide with an alkali metal formaldehyde bisulfite in aqueous solution or with a mixture of an alkali metal bisulfite and formaldehyde in water (which forms the desired formaldehyde bisulfite in situ). The sodium or potassium salts are most useful. At least about an equimolar proportion of the alkali metal formaldehyde bisulfite or a formaldehyde-alkali metal bisulfite mixture is necessary for the reaction. Some excess may be used, but there is no appreciable gain in so doing. The reaction mixtures are generally heated at a temperature of at least about 40° C. up to about 90° C. for a period of at least ten or fifteen minutes. Concentration of the solution or utilization of concentrated solutions of the reactants permits of crystallization of the 1-aroyl-2-sulfomethylhydrazine product from water. In general, yields of the products are quite good. These products are stable under neutral conditions but not in the presence of alkali.

The alkali metal sulfomethyl derivatives thus obtained may be converted to the cyanomethyl derivatives by treatment with a solution of a water-soluble cyanide, preferably an alkali metal cyanide (e. g. the sodium or potassium compounds). Alternatively, a crude solution of the alkali metal sulfomethyl derivative may be treated directly with the cyanide, without intermediate isolation, to obtain the cyanomethyl derivative. The cyanomethyl derivatives are somewhat less soluble in water than the alkali metal sulfomethyl compounds and may be crystallized. Both products may be recrystallized from water by heating until dissolved and cooling. Both the sulfomethyl derivatives and the cyanomethyl derivatives are white crystalline compounds, readily purified, having distinct melting points and, in general, conforming closely to the analytical values calculated from their structural formulas.

The following examples are given by way of illustration and are not intended as a limitation of this invention. Indeed, as many apparently widely different embodiments of the present invention may be made without departing from the spirit and scope hereof, it is to be understood that the invention is only limited as defined in the appended claims.

EXAMPLE I

*Sodium 1-isonicotinyl-2-sulfomethylhydrazine*

A solution of 16.2 grams (0.2 mole) of 37% formaldehyde solution in water and 20.8 grams (0.2 mols) of sodium bisulfite in about 32 milliliters of water was heated at 65° with stirring until the odor of formaldehyde had disappeared. The sodium formaldehyde bisulfite is formed in this operation. A solution of 27.4 grams (0.2 mole) of isoniazid in 50 milliliters of warm water was added. The mixture was heated on a steam bath at about 90°–100° C. for one hour. The solution was then concentrated under vacuum to approximately 25 milliliters and the mixture was cooled on ice. The crystalline product was filtered, washed with a small volume of cold water and dried. It was recrystallized from the minimum volume of hot water and dried in vacuo over phosphorus pentoxide. The product obtained in this manner was a monohydrate with a melting point of 168.5° to 170.5° C. with decomposition.

*Anal.*—Calcd. for $C_7H_8N_3O_4SNa \cdot H_2O$: C, 30.99; H, 3.72; N, 15.48. Found: C, 31.24; H, 3.65; N, 15.26.

EXAMPLE II

*1-isonicotinyl-2-cyanomethylhydrazine*

The process described in Example I was repeated up to the point where the solution of the sulfomethyl compound was to be concentrated. The mixture was cooled to 65° and a solution of 9.8 grams (0.2 mole) of sodium cyanide in 35 milliliters of warm water was added. The crystalline product separated almost immediately. The compound was redissolved in the solution by heating on a steam bath for 20 minutes and the crystalline product was separated by cooling and filtration. It was recrystallized from water. The melting point of this material was 189° to 190° C.

*Anal.*—Calcd. for $C_8H_8N_4O$: C, 54.54; H, 4.60. Found: C, 54.40; H, 4.85.

EXAMPLE III

*1-isonicotinyl-2-cyanomethylhydrazine*

A solution of 2.5 grams (0.01 mole) of sodium 1-isonicotinyl-2-sulfomethylhydrazine in 5 milliliters of water was mixed with a solution of 0.5 gram (0.01 mole) of sodium cyanide in two milliliters of water. After warming for about one minute on a steam bath, a dense slurry of crystals formed. The mixture was cooled, filtered and the product was washed with a small volume of cold water. The product melted at 184.5° to 186° C.

EXAMPLE IV

1-benzoyl-2-cyanomethylhydrazine

A solution of 7.1 grams (0.087 mole) of 37% formaldehyde solution and 9.0 grams (0.087 mole) of sodium bisulfite in 21 milliliters of water was warmed to about 60° for one and one-half hours. The warm solution was then treated with a solution of 8.5 grams (0.063 mole) of benzoic acid hydrazide in 21 milliliters of warm water. The mixture was stirred and heated on a steam bath for one hour and then cooled. A portion of the solution was concentrated to obtain crystalline sodium 1-benzoyl-2-sulfomethylhydrazine. The remainder of the solution was treated with an approximately equimolar proportion of sodium cyanide dissolved in 10 milliliters of water. The cyanomethyl derivative of benzoic acid hydrazide crystallized shortly after the solutions were mixed. This product was recrystallized from water and was found to melt at 154°–155° C.

*Anal.*—Calcd. for $C_9H_9N_3O$: C, 61.70; H, 5.19; N, 23.97. Found: C, 61.36; H, 5.30; N, 23.95.

EXAMPLE V

1-isonicotinyl-2-isopropyl-2-cyanomethylhydrazine

A solution of potassium formaldehyde bisulfite in water was prepared by heating solutions of formaldehyde and potassium bisulfite. The product was reacted with an aqueous solution of 1-isonicotinyl-2-isopropylhydrazine. The mixture was heated on a steam bath for one hour and a portion of the solution was cooled and concentrated under vacuum to obtain crystalline potassium 1-isonicotinyl-2-isopropyl-2-sulfomethylhydrazine. The remainder of the solution was treated with a solution of potassium cyanide and the 2-cyanomethyl derivative of 1-isonicotinyl-2-isopropylhydrazine separated. This material was filtered, washed with cold water, and dried.

What is claimed is:

1. A process for the conversion of:

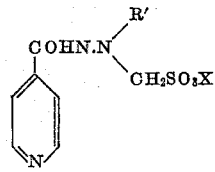

wherein R' is selected from the group consisting of hydrogen and alkyl containing up to 6 carbon atoms and X is an alkali metal to:

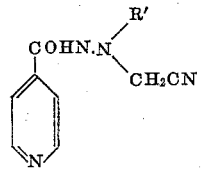

which comprises contacting the former in aqueous solution with a metal cyanide.

2. A process for the conversion of 1-isonicotinyl-2-sulfomethylhydrazine to 1-isonicotinyl-2-cyanomethylhydrazine which comprises contacting the former in aqueous solution with a metal cyanide.

References Cited in the file of this patent

UNITED STATES PATENTS

| | | |
|---|---|---|
| 2,580,919 | Howard | Jan. 1, 1952 |
| 2,628,237 | Fox | Feb. 10, 1953 |

FOREIGN PATENTS

| | | |
|---|---|---|
| 472,362 | Canada | Mar. 20, 1951 |
| 132,621 | Germany | July 8, 1902 |